(12) United States Patent
Fredriksson (10) Patent No.: US 7,707,205 B2
(45) Date of Patent: Apr. 27, 2010

(54) APPARATUS AND METHOD FOR LOCATING A TARGET ITEM IN A LIST

(75) Inventor: Jenny Fredriksson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 320 days.

(21) Appl. No.: 11/773,455

(22) Filed: Jul. 5, 2007

(65) Prior Publication Data

US 2009/0012952 A1    Jan. 8, 2009

(51) Int. Cl.
*G06F 7/00* (2006.01)

(52) U.S. Cl. .................................... 707/713
(58) Field of Classification Search ............ 707/2
See application file for complete search history.

(56) References Cited

U.S. PATENT DOCUMENTS

| 6,239,803 | B1 | 5/2001 | Driskell | |
| 2004/0012679 | A1* | 1/2004 | Fan | 348/207.99 |
| 2004/0132467 | A1* | 7/2004 | Hull et al. | 455/458 |
| 2005/0192822 | A1* | 9/2005 | Hartenstein et al. | 705/1 |

FOREIGN PATENT DOCUMENTS

| DE | 10016177 | 3/2000 |
| GB | 2372117 | 4/2002 |

OTHER PUBLICATIONS

International Search Report and Written Opinion, Application No. PCT/IB2007/004125, mailed July 1, 2008.
Sandnes et al.; "Techniques for fast and easy mobile text-entry with three-keys"; Proceedings of the 37th Hawaii International Conference on System Sciences; 2004; pp. 1-10.
Booch; "Software Components with Ada"; Structures, Tools, and Subsystems; 1987; 8 pages.

* cited by examiner

*Primary Examiner*—Charles Rones
*Assistant Examiner*—Fazlul Quader
(74) *Attorney, Agent, or Firm*—Renner, Otto, Boisselle & Sklar (57) ABSTRACT

Process for locating target item in a list including a plurality of items in sequence from 1 to m, including: (a) defining a range within the list including the target item, including: i) identifying a first item at location "n", where $1 \leq n \leq m$; ii) identifying a last item at location "p" where $n \leq p \leq m$; (b) identifying and displaying an item at location $D=((p-n)/2+n)$; (c) determining location of target relative to "D". If the target is at or adjacent "D", terminate the process and display the target item; if the target is between "n" and "D", resetting "p" to "D", repeat steps (b) and (c); if the target item is between "D" and "p", resetting "n" to "D", repeat steps (b) and (c); until the target item is at or adjacent the location "D".

20 Claims, 5 Drawing Sheets

APPARATUS AND METHOD FOR LOCATING
A TARGET ITEM IN A LIST

TECHNICAL FIELD OF THE INVENTION

The present invention relates generally to electronic devices, such as electronic devices for engaging in voice communications. More particularly, the invention relates to a device and method for locating a target item, such as information relating to a specific contact, in a list containing a plurality of such items, such as a contact list, where the list is stored electronically in an electronic device.

DESCRIPTION OF THE RELATED ART

Mobile and/or electronic devices are becoming increasingly popular. For example, mobile telephones and portable media players are now in wide-spread use. In addition, the features associated with certain types of electronic devices have become increasingly diverse. To name a few examples, many electronic devices include cameras, text messaging capability, Internet browsing functionality, electronic mail capability, video playback capability, audio playback capability, image display capability, navigation capability, and hands-free headset interfaces.

Conventional electronic devices often include a contact list for storing contact information, such as phone numbers, email addresses, pictures, etc., of individuals known by a user of the device. As electronic device usage becomes more frequent and central to the user's communications to others, and as the storage capabilities of electronic devices increase dramatically, the contact list may become quite lengthy, including hundreds or even thousands of contacts in any given contact list. Similarly, conventional media players may include hundreds or even thousands of items such as songs in any given list.

Conventional electronic devices often include a relatively small display area, for example, from 3-5 cm. on a side. The resulting "tunnel vision" significantly limits the number of items viewable on the display at any one time to a small fraction of the total number of items that may be stored in the memory of the electronic device.

These facts combine to create a significant drawback to the use of conventional lists such as contact or song lists in conventional electronic devices, since it can be tedious and cumbersome to scroll through the entire list one by one or page by page until the sought target item is located. While alphabetical search capabilities may be available, when a list is quite lengthy, searching in this manner can also be tedious.

SUMMARY

As is evident, the simple task of locating specific items of information from an electronic device's list of items can be a tedious and time consuming task.

The present invention provides a method and apparatus for easily and efficiently locating an individual item from a large number of items stored in a list of a portable electronic device. The method provides the capability of moving through the list to the target item in a very efficient manner, by use of a logical series of "jumps" down and/or up the list, as needed.

According to a first aspect, the invention relates to a process for locating a target item within a list including a plurality of m items locatable in numerical sequence from 0 to m, comprising:

(a) defining a range within the list of items in which to locate the target item, comprising:

i) identifying a first item at a location "n" representing a first end of the range, where $0 \leq n \leq m$;
ii) identifying a last item at a location "p" representing a second end of the range, where $n \leq p \leq m$;

(b) identifying and displaying an item at a location "D" within the range, wherein $D=((p-n)/2+n)$;

(c) determining a location of the target item relative to the location "D", wherein if the target item is at or adjacent the location "D", terminating the process and displaying the target item;

if the target item is between "n" and the location "D", resetting "p" to the value of "D" and repeating steps (b) and (c);

if the target item is between the location "D" and "p", resetting "n" to the value of "D" and repeating steps (b) and (c); and repeating steps (b) and (c) until the target item is located.

According to another aspect, the present invention relates to a portable electronic device comprising a display, memory and processor programmed to carry out a process for locating a target item within a list including a plurality of m items locatable in numerical sequence from 0 to m, the process comprising:

(a) defining a range within the list of items in which to locate the target item, comprising:

i) identifying a first item at a location "n" representing a first end of the range, where $0 \leq n \leq m$;
ii) identifying a last item at a location "p" representing a second end of the range, where $n \leq p \leq m$;

(b) identifying and displaying an item at a location "D" within the range, wherein $D=((p-n)/2+n)$;

(c) determining a location of the target item relative to the location "D", wherein if the target item is at or adjacent the location "D", terminating the process and displaying the target item;

if the target item is between "n" and the location "D", resetting "p" to the value of "D" and repeating steps (b) and (c);

if the target item is between the location "D" and "p", resetting "n" to the value of "D" and repeating steps (b) and (c); and repeating steps (b) and (c) until the target item is located.

In one embodiment, the range comprises all items on the list.

In one embodiment, the range comprises a subset of all items on the list.

In one embodiment, at least one of the first item representing the first end of the range and the last item representing the second end of the range is identified by default values.

In one embodiment, at least one of the first item representing the first end of the range and the last item representing second end of the range is identified by user input.

In one embodiment, determining a location of the target item relative to the location "D" is based on user input.

In one embodiment, the device is programmed to employ standard keys for the user input.

In one embodiment, the device is programmed to employ standard keys for the user input.

In one embodiment, the list is stored in the memory.

In one embodiment, the program comprises logic obtained from logic circuitry, software, firmware or a combination of any two or more thereof.

According to a further aspect, the present invention relates to a method of locating a target item in a list of items in a portable electronic device, including:

providing a portable electronic device comprising a display, a memory and a processor programmed to carry out the process for locating a target item within a list including a plurality of m items locatable in numerical sequence from 0 to m, the process comprising:

(a) defining a range within the list of items in which to locate the target item, comprising:
  i) identifying a first item at a location "n" representing a first end of the range, where $0 \leq n \leq m$;
  ii) identifying a last item at a location "p" representing a second end of the range, where $n \leq p \leq m$;

(b) identifying and displaying an item at a location "D" within the range, wherein $D=((p-n)/2+n)$;

(c) determining a location of the target item relative to the location "D", wherein if the target item is at or adjacent the location "D", terminating the process and displaying the target item;

if the target item is between "n" and the location "D", resetting "p" to the value of "D" and repeating steps (b) and (c);

if the target item is between the location "D" and "p", resetting "n" to the value of "D" and repeating steps (b) and (c); and repeating steps (b) and (c) until the target item is located.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Embodiments will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smartphones, portable communication apparatus or the like.

In the present disclosure, embodiments are described primarily in the context of a mobile telephone. It will be appreciated, however, that the exemplary context of a mobile telephone is not the only context and the context may relate to any type of appropriate electronic equipment, examples of which include a media player, a gaming device and a computer. In addition, it should be understood that, while the present invention is described with respect to a device having physically activatable keys for selection of items in accordance with the invention, the present invention is equally applicable to devices in which virtual keys or other selectable elements are provided, such as on a touchscreen or other such display/keyboard or display/selectable item combination. In such an embodiment, the appropriate functions for carrying out the present invention would be applied to the touchscreen or other virtual keys or selectable elements in ways corresponding to those described herein, as will be readily understood by the skilled artisan.

Figure 1:
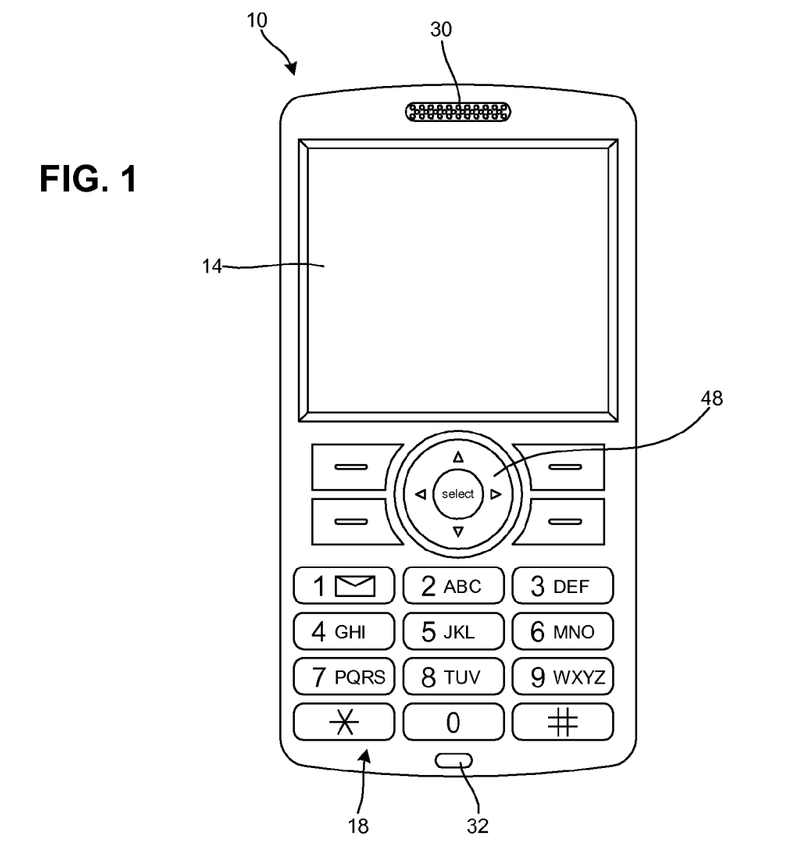
FIG. 1 is a schematic view of a mobile telephone as an exemplary electronic device that includes programming for locating a target item in accordance with the present invention.
Figure 3:
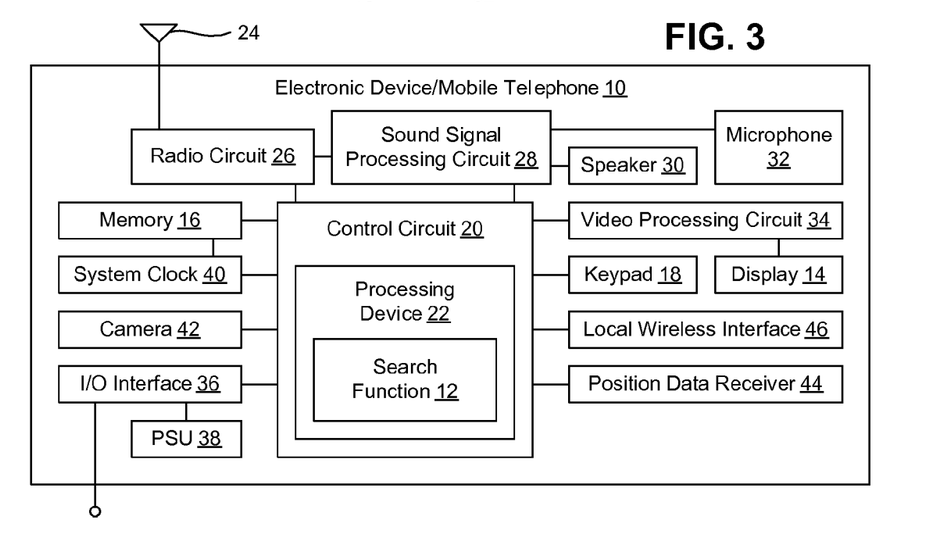
FIG. 3 is a schematic block diagram of the mobile telephone of FIG. 1.

Referring initially to FIGS. 1 and 3, an electronic device is shown. The electronic device 10 includes a search function 12 that is configured to locate a specific target item of information in a list or lists contained within the electronic device. Additional details and operation of the search function 12 will be described in greater detail below. The search function 12 may be embodied as executable code that is resident in and executed by the electronic device 10. In one embodiment, the search function 12 may be a program stored on a or machine readable medium such as non-volatile memory or the like. The search function 12 may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 includes a display 14. The display 14 displays information to a user such as operating state, time, telephone numbers, contact information, various navigational menus, etc., that enable the user to utilize the various features of the mobile telephone 10. The display 14 also may be used to visually display content received by the mobile telephone 10 and/or retrieved from a memory 16 (FIG. 3) of the mobile telephone 10. The display 14 may be used to present images, video and other graphics to the user, such as photographs, mobile television content and video associated with games.

A keypad 18 provides for a variety of user input operations. For example, the keypad 18 may include alphanumeric keys for allowing entry of alphanumeric information such as telephone numbers, phone lists, contact information, notes, text, etc. In addition, the keypad 18 may include special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

Included in the keypad 18 is a multi-function navigation and selection key 48. The key 48 may be used in the present invention, for example, for functions to be described below, such as SELECT, ARROW UP, and ARROW DOWN, as well as for standard navigation actions. When the search function is not activated, the key 48 can be used for scrolling up, down or sideways, and the "select" button may be used as in known in the art.

In accordance with one embodiment of the present invention, the SEARCH function may be activated from a menu displayed on the display 14. When the SEARCH function has been activated, the multi-function navigation and selection key 48 may be configured such that the "select" button functions as SELECT, the up arrow functions as ARROW UP, the down arrow functions as ARROW DOWN, and the left/right arrows function to begin or end the search process, or to take other actions. These or other keys or touchpad items may be programmed to function as "soft" buttons for these or other uses, as will be understood by the skilled artisan.

Figure 2:
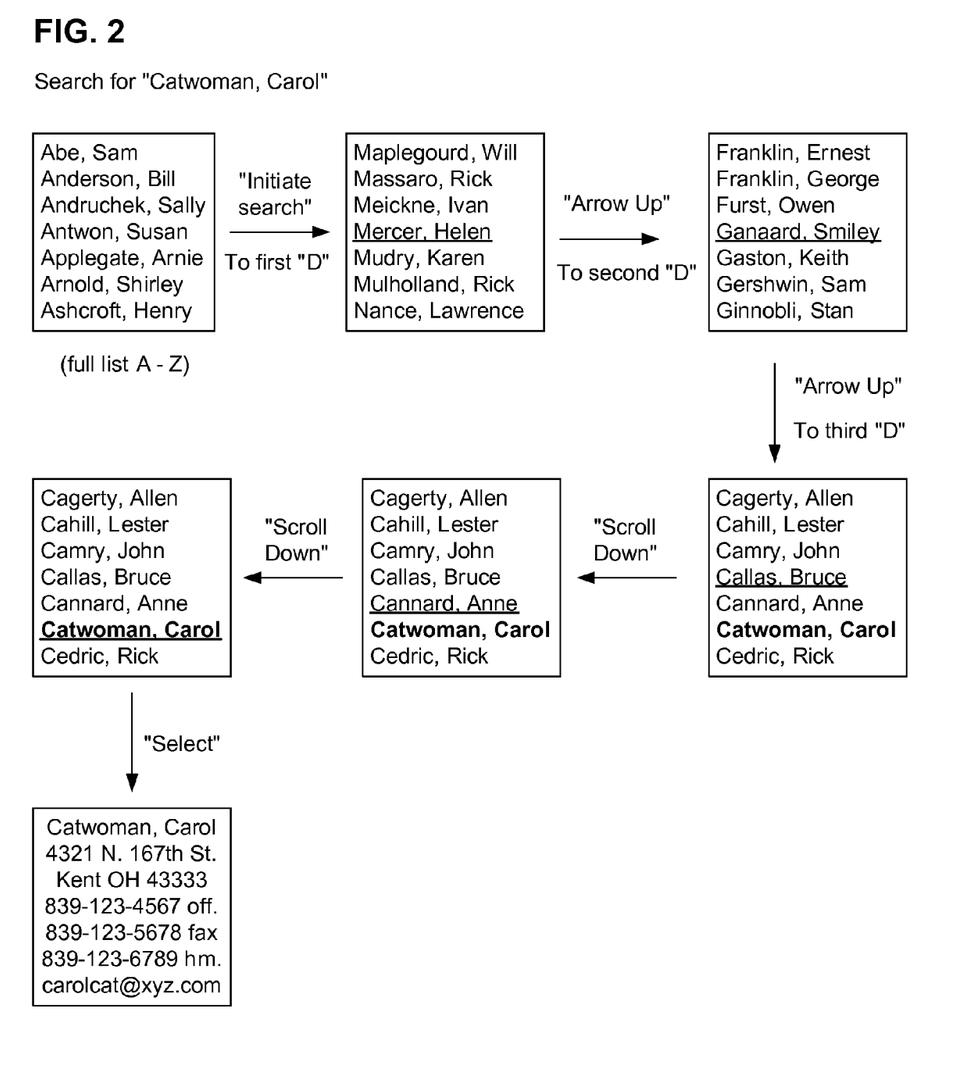
FIG. 2 is a block diagram illustrating items listed in the display of a mobile telephone during an exemplary search for a specific target item, in accordance with an embodiment of the invention.

FIG. 2 is a block diagram illustrating items listed in the display of a mobile telephone during an exemplary search for a specific target item, in accordance with an embodiment of the invention. In the example shown in FIG. 2, the user is searching for a specific target item, a contact by the name of "Carol Catwoman" on a list of contacts beginning with Sam Abe (shown as "Abe, Sam") and ending at the other end of the alphabet. When the search is initiated, in accordance with the present invention and as described in more detail below, the method causes the display "D" to move to display an item located halfway from the beginning of the list to the end of the list which, in this example, is "Mercer, Helen", as shown (underlined) in FIG. 2. Since the target item, "Catwoman, Carol", is located above, or closer to the beginning of the list than "Mercer, Helen" the user presses the "ARROW UP" key. This action results in determination of a new, second, "D" which is halfway between the first "D" ("Mercer, Helen") and the beginning of the list. In this example, the item displayed at the second "D" is "Ganaard, Smiley", as shown in FIG. 2. Since the target item, "Catwoman, Carol", is located above, or closer to the beginning of the list than "Ganaard, Smiley" the user again presses the "ARROW UP" key. This action results in determination of a new, third, "D" which is halfway between the second "D" ("Ganaard, Smiley") and the beginning of the list. In this example, the item displayed at the third "D" is "Callas, Bruce", as shown in FIG. 2. At this point, the user could continue the search, this time by pressing the "ARROW DOWN" key, to determine, move to and display a fourth "D". However, as shown in FIG. 2, the desired target item, "Catwoman, Carol", is visible in the display. Thus, the desired target item, "Catwoman, Carol" is considered to be adjacent to the currently displayed "D". In this case, the user may press an appropriate key to end the search, and simply "SCROLL DOWN" two steps to the desired target item, "Catwoman, Carol". The user may then "SELECT" desired target item, "Catwoman, Carol", at which point, in this example, the contact information for Carol Catwoman is displayed. For other types of list, other actions may be taken upon activating a "SELECT" function, such as displaying information about the song or movie, etc., that is the target item. In one embodiment, the device and method may include an option for contacting the contact by telephone or email directly, or playing the song or movie directly, rather than displaying the contact, song, movie or other information. FIG. 2 simply illustrates an example of how the present invention may be applied in a particular context to assist in understanding the present invention, but should not be considered as limiting the scope of the invention, which is limited only by the scope of the appended claims.

The mobile telephone 10 includes call circuitry that enables the mobile telephone 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 16, executing applications to allow user interaction with the data, displaying video and/or image content associated with the data, outputting audio sounds associated with the data, and so forth.

FIG. 3 represents a functional block diagram of the mobile telephone 10. For the sake of brevity, many features of the mobile telephone 10 will not be described in great detail. The mobile telephone 10 includes a primary control circuit 20 that is configured to carry out overall control of the functions and operations of the mobile telephone 10. The control circuit 20 may include a processing device 22, such as a central processing unit (CPU), microcontroller or microprocessor. The processing device 22 executes code stored in a memory (not shown) within the control circuit 20 and/or in a separate memory, such as the memory 16, in order to carry out operation of the mobile telephone 10. Among other tasks, the control circuit 20 may carry out timing functions, such as timing the durations of calls, generating the content of time and date stamps, and so forth. The memory 16 may be, for example, one or more of a buffer, a flash memory, a hard drive, a removable media, a volatile memory, a non-volatile memory, a random access memory (RAM), or other suitable device. In a typical arrangement, the memory 16 may include a non-volatile memory (e.g., a NAND or NOR architecture flash memory) for long term data storage and a volatile memory that functions as system memory for the control circuit 20. The volatile memory may be a RAM implemented with synchronous dynamic random access memory (SDRAM). The memory 16 may exchange data with the control circuit 20 over a data bus. Accompanying control lines and an address bus between the memory 16 and the control circuit 20 also may be present.

In addition, the processing device 22 may execute code that implements the search function 12. It will be apparent to a person having ordinary skill in the art of computer programming, and specifically in application programming for mobile telephones or other electronic devices, how to program a mobile telephone 10 to operate and carry out logical functions associated with the search function 12. Accordingly, details as to specific programming code have been left out for the sake of brevity. Also, while the search function 12 is executed by the processing device 22 in accordance with an embodiment, such functionality could also be carried out via dedicated hardware or firmware, or some combination of hardware, firmware and/or software.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24. The radio circuit 26 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter. The PSU 38 may supply power to operate the mobile telephone 10 in the absence of an external power source.

The mobile telephone 10 also may include a system clock 40 for clocking the various components of the mobile telephone 10, such as the control circuit 20 and the memory 16.

The mobile telephone 10 may include a camera 42 for taking digital pictures and/or movies. Image and/or video files corresponding to the pictures and/or movies may be stored in the memory 16.

The mobile telephone 10 also may include a position data receiver 44, such as a global positioning system (GPS) receiver, Galileo satellite system receiver or the like. The position data receiver 44 may be involved in determining the location of the mobile telephone 10.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 4:
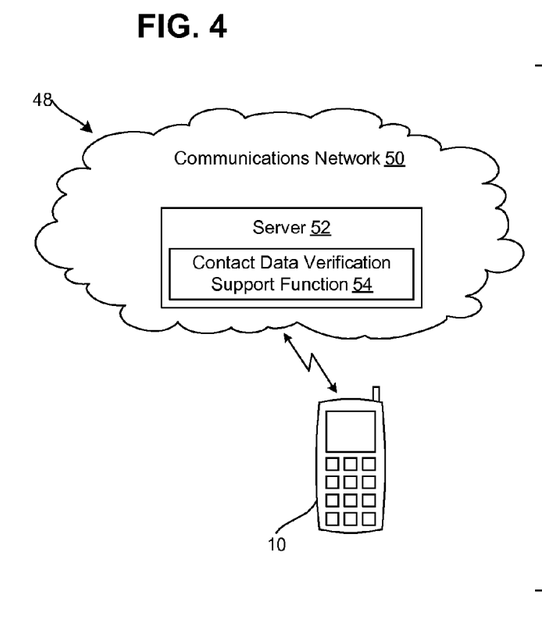
FIG. 4 is a schematic diagram of a communications system in which the mobile telephone of FIG. 1 may operate.

With additional reference to FIG. 4, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As noted, electronic devices such as the mobile telephone 10 usually include a list of contacts. With increases in use, the list of contacts may become extensive, making difficult the locating of any particular item on the list. In other portable electronic devices, such as MP3 players, many of which are capable of storing hundreds or thousand of songs in gigabyte quantities, the extensive list similarly makes difficult the location of a particular song. The present invention provides a method to greatly simplify locating such items on a list in an electronic device. An example has been described above with respect to FIG. 2. The process described with respect to FIG. 2 may be adapted to conduct any search within the scope of the present invention, in accordance with the more general principles set forth in the following.

Thus, in one embodiment, the invention relates to a process for locating a target item within a list including a plurality of m items in numerical sequence from 0 to m, including:

(a) defining a range within the list of items in which to locate the target item, comprising:

i) identifying a first item at a location "n" representing a first end of the range, where $0 \leq n \leq m$;

ii) identifying a last item at a location "p" representing a second end of the range, where $n \leq p \leq m$;

(b) identifying and displaying an item at a location "D" within the range, wherein $D=((p-n)/2+ n)$;

(c) determining a location of the target item relative to the location "D", wherein if the target item is at or adjacent the location "D", terminating the process and displaying the target item;

if the target item is between "n" and the location "D", resetting "p" to the value of "D" and repeating steps (b) and (c);

if the target item is between the location "D" and "p", resetting "n" to the value of "D" and repeating steps (b) and (c); and repeating steps (b) and (c) until the target item is located.

As used herein, when referring to the position of a target item, the term "adjacent" means that the target item is displayed on a display screen of the electronic device, and may be immediately next to an item designated by "D", or may be removed one or more items, as long as it is visible to the user on the display screen.

Figure 5:
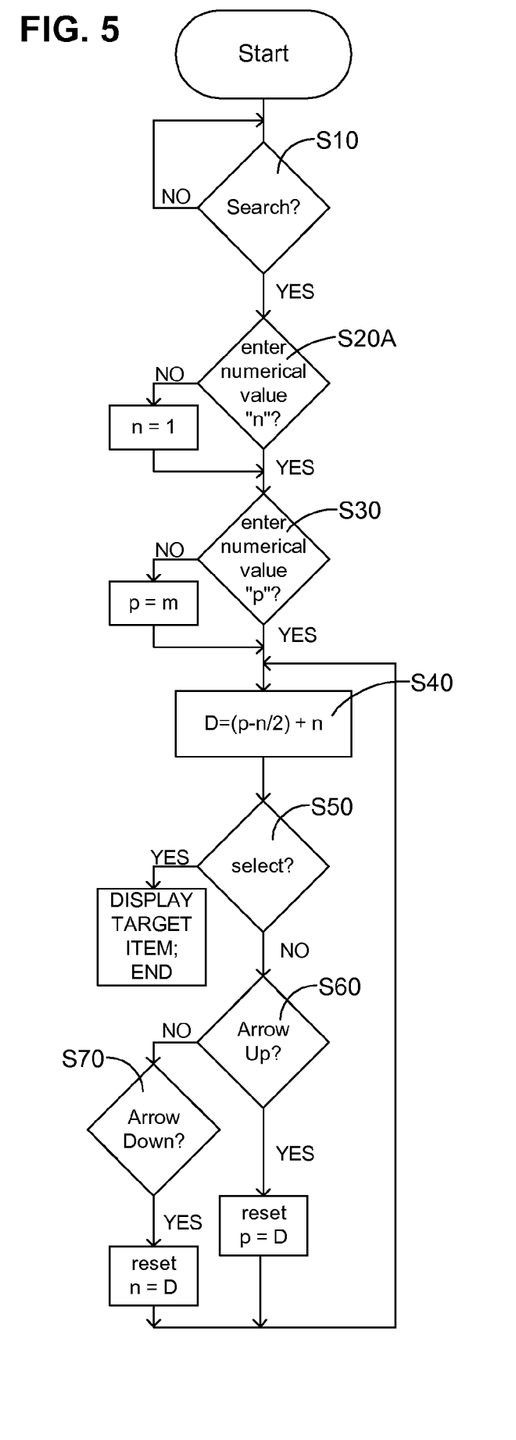
FIG. 5 is a flow chart representing an exemplary method of locating a target item in accordance with the present invention using an electronic device such as the mobile telephone of FIG. 1.

FIG. 5 is a flow chart representing an exemplary method of locating a target item in accordance with the present invention using an electronic device such as the mobile telephone of FIG. 1. As shown in FIG. 5, the method starts when a user presses a search key on a keypad to initiate a search, in step S10. The key may be a dedicated "search" function key or, more often, will be an activation key used to select a "search" function from a list of possible functions. Initiating the search may include, for example, display of a query to the user whether the search should begin at a designated location on the list or if, e.g., by default, the search should begin with the first item on the list. Similarly, a query may be displayed to the user whether the search should end at a designated location on the list or if, e.g., by default, the search should end with the last item on the list. In one alternative, the user may designate and/or be queried to designate an alphabetical letter, e.g., letter "G", in which the target item is expected to be located.

Next, in step S20A, the program queries whether the user has input a numerical value for "n". If yes, the value that was input is assigned to "n". If no, then the program sets "n"=0 (zero). Next, in step S30, the program queries whether the user has input a numerical value for "p". If yes, the value that was input is assigned to "p". If no, then the program sets "p" equal to the numerical value of m, the final item number on the list. Thus, if the user does not input numerical values for "n" and "p", when the search begins, the list to be searched includes all of the items on the list, i.e., numbered from 0 to m.

Referring still to FIG. 5, when the values of "n" and "p" have thus been determined, in step S40, using the equation $D=((p-n)/2)+n$, an initial location "D" is identified. The method causes the electronic device display to show the item stored at location "D". The user can then see the item stored at location "D" and determine whether this is the target item. If the item at location "D" is the target item, then the user can press a "SELECT" key or activate a "SELECT" option, in step S50. As shown in FIG. 5, in step S50, if the "SELECT" option is YES, then since the item stored at location "D" is the target item, the process terminates and the target item is displayed.

Depending on the capability of the display, items on the list adjacent to the item stored a location "D" may also be displayed. In one embodiment, at least immediately adjacent items are shown, for convenience, to avoid the necessity of conducting another search cycle when the target item is within one or two items of the item at the location "D". If the item at the location "D" is not the target item, then the user presses another key on the keypad, such as an "UP" arrow key, to indicate the target item is between "n" and "D", or a "DOWN" arrow key, to indicate the target item is between "D" and "p". Either the "UP" or "DOWN" arrow key must be pressed, if the "SELECT" key is not pressed. As shown in FIG. 5, if in step S60 the "UP" arrow key is pressed, then the value of "p" is reset to the value of "D" used in the immediately preceding iteration, and the process returns to step S40 in which a new value of "D" is calculated, retaining the original value of "n". If in step S70, the "DOWN" arrow is pressed, then the value of "n" is reset to the value of "D" used in the immediately preceding iteration, and the process returns to step S40 in which a new value of "D" is calculated, retaining the original value of "p". This process continues, repeating the steps of resetting the value of "p" or "n", identifying and displaying a value of "D", and determining if the target item is at the location "D", until the target item is located.

As noted, the target item may be located when it is at or adjacent to the location "D" as determined in step S40. In one embodiment, when the target item is adjacent to the location "D", that is, when the target item is not exactly at the location "D" but is within the relatively narrow field of view of the display and therefore visible to the user, the user may scroll to or otherwise select the target item and proceed as if the target item had been directly located by the process. This option is sometimes referred to herein as when the target item is "adjacent" to the location "D", as opposed to being exactly "at" the location D. In exercising this option, the user may terminate the search process by selecting an "end" function key, for example, then using the arrow keys to scroll up or down to the "adjacent" target item visible in the display, and then selecting the target item for detailed display, direct contact, or playing a song, for example. An example of locating and selecting a target item adjacent to the location "D" in a contact list of names has been described above in the example shown in FIG. 2.

Figure 6:
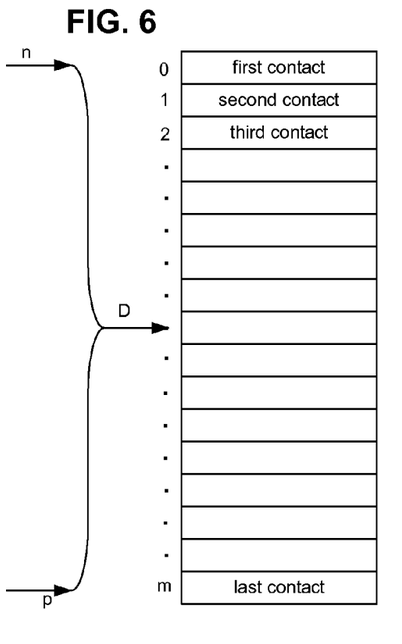
FIG. 6 is a schematic illustration of selection of points for carrying out the method in accordance with an embodiment of the present invention, as described above with respect to FIG. 5.
Figure 7:
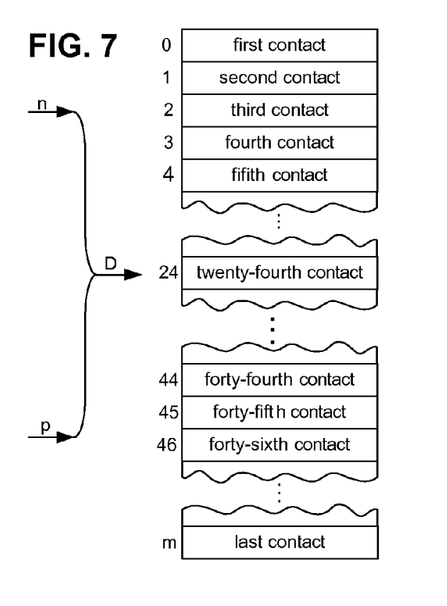
FIG. 7 is a schematic illustration of another embodiment of the selection of points for carrying out the method in accordance with an embodiment of the present invention, as described above with respect to FIG. 5.

FIGS. 6 and 7 provide examples of the process of FIG. 5, in which either the entire list is searched or a numerically defined subset of the list is selected for searching. FIG. 6 is a schematic illustration of selection of points for carrying out the method in accordance with an embodiment of the present invention, as described above with respect to FIG. 5. In FIG. 6, the initial value of "n" is zero, corresponding to the first contact on the list, and the initial value of "p" is set to be equal to the value "m", which is the number associated with the last or final item on the list. In this example, in the first iteration of the process, the value of "D" is halfway between "n"=0 and "p"=m. Subsequent iterations of the search will of course redefine or reset the values of "n" and "p" depending on the location of the sought target item with respect to the value of "D" determined by each such iteration of the process of FIG. 5.

FIG. 7 is a schematic illustration of another option for selection of points for carrying out the method in accordance with another embodiment of the present invention, as described above with respect to FIG. 5. In FIG. 7, the initial value of "n" is two (2), corresponding to the third contact (or item) on the list, and the initial value of "p" is set to be equal to 46, which is the number associated with the forty-sixth contact (or item) on the list. In this example, in the first iteration of the process, the value of "D" is halfway between "n"=2 and "p"=46, so that D=24. Subsequent iterations of the search will of course redefine or reset the values of "n" or "p" as appropriate depending on the location of the sought target item with respect to the value of "D" determined by each such iteration of the process of FIG. 5.

Figure 8:
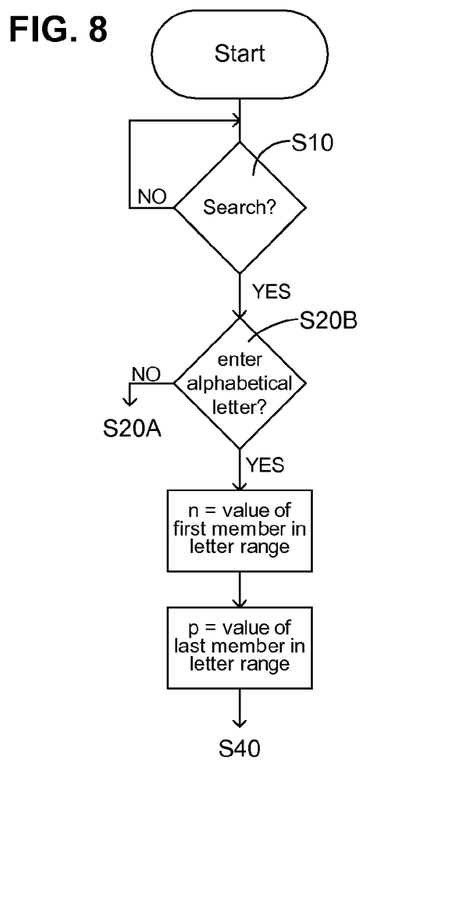
FIG. 8 is a flow chart representing another embodiment of an exemplary method of locating a target item in accordance with the present invention using an electronic device such as the mobile telephone of FIG. 1.

FIG. 8 is a flow chart representing another embodiment of an exemplary method of locating a target item in accordance with the present invention using an electronic device such as the mobile telephone of FIG. 1. The flow chart in FIG. 8 is similar to that in FIG. 5, except that in step S20B, an alphabetical letter is entered instead of the numerical value of "n" being entered as shown in step S20A. As shown in FIG. 8, if no alphabetical letter is entered, the process defaults to step S20A of the flow chart shown in FIG. 5, and the process continues as described above with respect to FIG. 5.

If, as shown in FIG. 8, an alphabetical letter is entered at step S20B, then according to one embodiment of the present invention, the initial value of "n" is set by the program to be equal to the numerical value of the first member of the subset of items beginning with that letter, and the initial value of "p" is set to the numerical value of the last member of the subset of items beginning with that letter. As shown in FIG. 8, when the initial values of "n" and "p" have been determined, the process moves to step S40 and the following steps as shown in FIG. 5, which are identical in the embodiment of FIG. 8 to the steps S40-S70 shown in FIG. 5.

Figure 9:
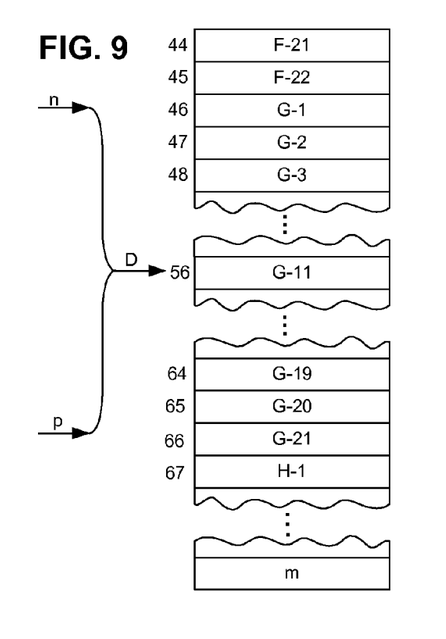
FIG. 9 is a schematic illustration of still another embodiment of the selection of points for carrying out the method in accordance with another embodiment of the present invention, as described above with respect to FIG. 8.

FIG. 9 provides an example of the process of FIG. 8, in which an alphabetically defined subset of the list is selected for searching. FIG. 9 is a schematic illustration of still another option for selection of points for carrying out the method in accordance with another embodiment of the present invention, as described above with respect to FIG. 8. In FIG. 9, the user has input the alphabetical letter "G" following selection of the "SEARCH" function. By selecting the alphabetical letter "G", in the exemplary embodiment of FIG. 9, the initial value of "n" is 46, corresponding to the first contact (or item) on the list beginning with the letter "G", shown as entry "G-1" in FIG. 9, and the initial value of "p" is set to be equal to 66, which is the number associated with the last contact (or item) on the list beginning with the letter "G", shown as entry G-21 in FIG. 9. In this example, in the first iteration of the process, the value of "D" is halfway between "n"=46 and "p"=66, i.e., D=56, corresponding to the entry G-11. Subsequent iterations of the search will of course redefine or reset the values of "n" and "p" depending on the location of the sought target item with respect to the value of "D" determined by each such iteration of the process of FIG. 8.

With additional reference to FIGS. 5 and 8, illustrated are logical operations to implement exemplary methods of locating target information in a list of information or items. The exemplary method may be carried out by executing an embodiment of the search function 12, for example, by use of the methods illustrated in FIGS. 4 and 7. Thus, the flow charts of FIGS. 4 and 7 may be thought of as depicting steps of two methods carried out by the mobile telephone 10. Although FIGS. 4 and 7 show a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Figure 10:
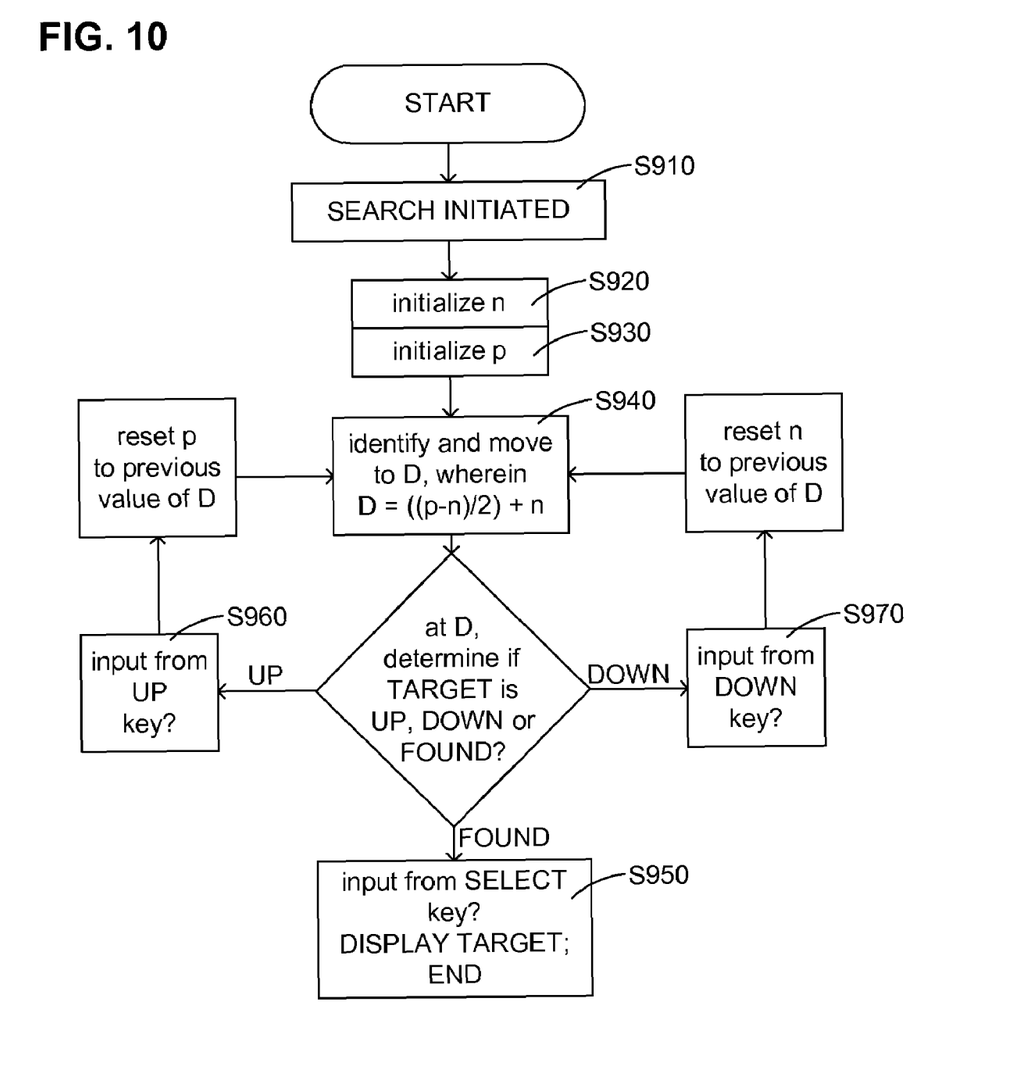
FIG. 10 is an overall flow chart representing an embodiment of an exemplary method of locating a target item in accordance with the present invention.

FIG. 10 is an overall flow chart representing an exemplary embodiment of a method of locating a target item in a list in accordance with the present invention. The overall process shown in FIG. 10 is a somewhat generalized depiction of the flow charts of FIGS. 5 and 8. As shown in FIG. 10, to start the process, at step S910 the search is initiated. In step S910, the search may be initiated via a standard key programmed to function as a search initiation key or by a dedicated search function key or the like (e.g., pressing either a pre-programmed or a dedicated key on the electronic device, etc.). As shown in steps S920 and S930, respective beginning and ending items on the contact list, referred to as "n" and "p" are set. As in the above-described embodiments, the values of "n" and "p" may be defined initially either by the user or by software based on the entire list or on some subset of the list, such as by user input of a numerical value or an alphabetical letter. Thus, the user may identify a sub-range by selecting specific beginning and ending items on the list, such as by selecting the first alphabetical letter of a name associated with the target item. In step S940 the process defines and moves to a first stop position "D", located halfway from the beginning or first item on the list or sub-range to the ending or last item on the list, as defined by the equation $D=((p-n)/2)+n$, where "n" and "p" are the values assigned according to the range or subset defined by the user or by the software. When the item at the location "D" is displayed (possibly together with adjacent items), the user observes the display to determine if the target item is shown on the display, is located prior to (e.g., higher on the list) the location "D", or is located after (e.g., lower on the list) the location "D". Based on this information, the user next presses one of a key (e.g., "SELECT") indicating the target item has been found, or a key indicating that the target item is "up" or "down" on the list relative to the first stop position (e.g., the "UP" or "DOWN" key, respectively), depending on the location of the target item in relation to the item(s) shown on the display. If the target item is displayed, the user presses the key indicating the target item has been found, and the list then may be opened to display the full information for the target item, and the user may select further options, such as "call", "modify", "play", etc., for the displayed target item, as appropriate.

As shown for step S960, upon selection of the "UP" key, the software redefines the "p" value as the current "D" value, a new "D" is calculated, and the process moves the display to a new "D" position halfway from the original "n" position to the newly defined "p" position. At this point, the user again observes the display, to determine if the target item is shown on the display, is located prior to, or higher on the list, or is located after, or lower on the list, and once again next presses one of a "SELECT" key, the "UP" key, or the "DOWN" key, depending on the location of the target item in relation to the display.

As shown for step S970, upon selection of the "DOWN" key, the software redefines the "n" value as the current "D" value, a new "D" is calculated, and the process moves the display to a new "D" position halfway from the newly defined "n" position to the original "p" position. At this point in the process, the user again observes the readout on the screen, to determine if the target item is displayed on the screen, is located prior to, or higher on the list, or is located after, or lower on the list, and once again next presses one of the "SELECT" key, the "UP" key, or the "DOWN" key, depending on the location of the target item in relation to the display.

This process continues until the target item is successfully located. This process may be conveniently referred to as "navigation by halves", since the process repeatedly divides the target list in half, then moves in the appropriate direction of the target item, relative to the halfway stopping point, until the target item is located.

Although the electronic device has been described generally in terms of a keypad made up of "hard" keys, in other embodiments, the electronic device may include one or more "soft" keys in addition to or in place of the "hard keys". As is well known, such soft keys may be formed, for example, by software and displayed on a touch-sensitive screen, or by software and displayed on a screen including a pointing device, e.g., a cursor, which can be used to activate the keys from a location such as the multi-function navigation and selection key 48 or one or more buttons located remotely, such as on a headset or a headset cable-mounted control device. In another embodiment, a touchpad and selection button, such as commonly used on laptop computers, may be used to navigate and select options in accordance with the invention. Many such devices are known in the art and the present invention is not limited to a specific, exemplary keypad described herein. Any suitable known means for navigating between and selecting alternatives may by used for this function.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A process for locating a target item within a list including a plurality of m items locatable in numerical sequence from 0 to m, in an electronic device comprising a display and a processor programmed to carry out the process, comprising:
    (a) defining a range within the list of items in which to locate the target item with the processor, comprising:
        i) identifying a first item at a location "n" representing a first end of the range, where $0 \leq n \leq m$;
        ii) identifying a last item at a location "p" representing a second end of the range, where $n \leq p \leq m$;
    (b) identifying with the processor and displaying on the display an item at a location "D" within the range, wherein $D=((p-n)/2+n)$;
    (c) determining with the processor a location of the target item relative to the location "D", wherein
    if the target item is at or adjacent the location "D", terminating the process and displaying the target item;
    if the target item is between "n" and the location "D", resetting "p" to the value of "D" and repeating steps (b) and (c);
    if the target item is between the location "D" and "p", resetting "n" to the value of "D" and repeating steps (b) and (c); and
    repeating steps (b) and (c) until the target item is located.

2. The process as in claim 1 wherein the range comprises all items on the list.

3. The process as in claim 1 wherein the range comprises a subset of all items on the list.

4. The process as in claim 1 wherein at least one of the first item representing the first end of the range and the last item representing the second end of the range is identified by default values.

5. The process as in claim 1 wherein at least one of the first item representing the first end of the range and the last item representing second end of the range is identified by user input.

6. The process as in claim 1 wherein determining a location of the target item relative to the location "D" is based on user input.

7. A portable electronic device comprising a display, memory and processor programmed to carry out a process for locating a target item within a list including a plurality of m items locatable in numerical sequence from 0 to m, the processor programmed to carry out at least the following steps:
    (a) defining a range within the list of items in which to locate the target item, comprising:
        i) identifying a first item at a location "n" representing a first end of the range, where $0 \leq n \leq m$;
        ii) identifying a last item at a location "p" representing a second end of the range, where $n \leq p \leq m$;
    (b) identifying and displaying an item at a location "D" within the range, wherein $D=((p-n)/2+n)$;
    (c) determining a location of the target item relative to the location "D", wherein
    if the target item is at or adjacent the location "D", terminating the process and displaying the target item;
    if the target item is between "n" and the location "D", resetting "p" to the value of "D" and repeating steps (b) and (c);
    if the target item is between the location "D" and "p", resetting "n" to the value of "D" and repeating steps (b) and (c); and
    repeating steps (b) and (c) until the target item is located.

8. The portable electronic device as in claim 7 wherein the range comprises all items on the list.

9. The portable electronic device as in claim 7 wherein the range comprises a subset of all items on the list.

10. The portable electronic device as in claim 7 wherein at least one of the first item representing the first end of the range and the last item representing the second end of the range is identified by default values.

11. The portable electronic device as in claim 7 wherein at least one of the first item representing the first end of the range and the last item representing second end of the range is identified by user input.

12. The portable electronic device as in claim 7 wherein determining a location of the target item relative to the location "D" is based on user input.

13. The portable electronic device as in claim 12 wherein the device is programmed to employ standard keys for the user input.

14. The portable electronic device as in claim 12 wherein the device is programmed to employ standard keys for the user input.

15. The portable electronic device as in claim 7 wherein the list is stored in the memory.

16. The portable electronic device as in claim 7 wherein the program comprises logic obtained from logic circuitry, software, firmware or a combination of any two or more thereof.

17. A method of locating a target item in a list of items in a portable electronic device, comprising:

providing a portable electronic device comprising a display, memory and processor programmed to carry out the process for locating a target item within a list including a plurality of m items locatable in numerical sequence from 0 to m, the processor programmed to carry out at least the following steps:

(a) defining a range within the list of items in which to locate the target item, comprising:

i) identifying a first item at a location "n" representing a first end of the range, where $0 \leq n \leq m$;

ii) identifying a last item at a location "p" representing a second end of the range, where $n \leq p \leq m$;

(b) identifying and displaying an item at a location "D" within the range, wherein $D=((p-n)/2+n)$;

(c) determining a location of the target item relative to the location "D", wherein     if the target item is at or adjacent the location "D", terminating the process and displaying the target item;

if the target item is between "n" and the location "D", resetting "p" to the value of "D" and repeating steps (b) and (c);

if the target item is between the location "D" and "p", resetting "n" to the value of "D" and repeating steps (b) and (c); and     repeating steps (b) and (c) until the target item is at or adjacent the location "D".

18. The process as in claim 17 wherein at least one of the first item representing the first end of the range and the last item representing second end of the range is identified by user input.

19. A program stored on a machine readable medium which, when executed by an electronic processor, executes the process of claim 17.

20. A program stored on a machine readable medium which, when executed by an electronic processor, executes the process of claim 1.

* * * * *